United States Patent
Debegnac et al.

(10) Patent No.: US 8,142,564 B2
(45) Date of Patent: Mar. 27, 2012

(54) PROCESS TO REDUCE THE AMOUNT OF CR (VI) IN A CEMENT-CONTAINING COMPOSITION AND A COMPOSITION COMPRISING CEMENT AND COATED METALLIC SULPHATE PARTICLES

(75) Inventors: Hélène Debegnac, Roche (FR); Christelle Sing, Sermerieu (FR)

(73) Assignee: Lafarge, Paris (FR)

( * ) Notice: Subject to any disclaimer, the term of this patent is extended or adjusted under 35 U.S.C. 154(b) by 303 days.

(21) Appl. No.: 12/532,978

(22) PCT Filed: May 6, 2008

(86) PCT No.: PCT/IB2008/002400
§ 371 (c)(1),
(2), (4) Date: Sep. 24, 2009

(87) PCT Pub. No.: WO2008/152521
PCT Pub. Date: Dec. 18, 2008

(65) Prior Publication Data
US 2010/0116173 A1    May 13, 2010

(30) Foreign Application Priority Data
May 10, 2007  (EP) ..................................... 07368007

(51) Int. Cl.
*C04B 22/14* (2006.01)

(52) U.S. Cl. ......... 106/713; 106/733; 106/736; 106/783
(58) Field of Classification Search ................... 106/713, 106/733, 736, 783
See application file for complete search history.

(56) References Cited

U.S. PATENT DOCUMENTS

| 3,803,292 A | 4/1974 | Bell |
| 6,830,761 B1 | 12/2004 | Zlotkin |
| 2002/0187185 A1 | 12/2002 | Jones |

FOREIGN PATENT DOCUMENTS

| DE | 296 13 095 U | 10/1996 |
| EP | 0 160 747 | 11/1985 |
| EP | 1 533 287 | 5/2005 |
| GB | 370878 | 4/1932 |
| JP | 07/232954 | 9/1995 |
| WO | WO 2005/048995 | 6/2005 |
| WO | WO 2007/080286 A2 | 7/2007 |

OTHER PUBLICATIONS

International Search Report for PCT/IB2008/002400.
International Preliminary Report on Patentability for International Application No. PCT/IB2008/002400, dated Nov. 19, 2009.

*Primary Examiner* — Paul Marcantoni
(74) *Attorney, Agent, or Firm* — Pillsbury Winthrop Shaw Pittman, LLP

(57) ABSTRACT

A method for producing a cement-containing material having a low content of soluble Cr (VI), the method including providing a cement-containing material with metallic sulphate particles coated with at least one product of the hydrolysis of a collagen material.

20 Claims, No Drawings

PROCESS TO REDUCE THE AMOUNT OF CR (VI) IN A CEMENT-CONTAINING COMPOSITION AND A COMPOSITION COMPRISING CEMENT AND COATED METALLIC SULPHATE PARTICLES

CROSS-REFERENCE TO RELATED APPLICATIONS

This is the U.S. National Stage of PCT/IB2008/002400, filed May 6, 2008, which in turn claims priority to European Patent Application No. 07368007.6, filed May 10, 2007, the entire contents of both applications are incorporated herein by reference in their entireties.

TECHNICAL FIELD

The present invention relates to coated particles of at least one metallic sulphate, in particular ferrous sulphate, which is suitable for the production of cements, especially cements featuring a low soluble chromium (VI) content. According to a particular feature of the invention these particles are coated with a collagen derivative such as a gelatine or an animal glue.

PRIOR ART

In the most general sense of the word, a cement is a binder that is a substance which sets and hardens independently, and can bind other materials together. Cements used in construction are characterized as hydraulic or non-hydraulic. The most important use of cement is the production of mortar and concrete—the bonding of natural or artificial aggregates to form a strong building material which is durable in the face of normal environmental effects. Hydraulic cements are materials which set and harden after combining with water, as a result of chemical reactions with the mixing water and, after hardening, retain strength and stability even under water. The key requirement for this is that the hydrates formed on immediate reaction with water are essentially insoluble in water. Most construction cements today are hydraulic, and most of these are based upon Portland cement, which is made primarily from limestone, certain clay minerals, and gypsum, in a high temperature process that drives off carbon dioxide and chemically combines the primary ingredients into new compounds. Non-hydraulic cements include such materials as (non-hydraulic) lime and gypsum plasters, which must be kept dry in order to gain strength, and oxychloride cements which have liquid components.

Cement composition, in particular hydraulic cement like Portland cement often contains water-soluble chromium (VI). The soluble hexavalent chromium (chromium (VI)) is generally present in the form of chromate, at concentrations ranging usually from 1 to 100 ppm (parts by million) in the cements. As this compound causes dermal sensitization and allergic reactions, the amount of soluble chromium (VI) should be as small as possible in a cement mix. Accordingly, current regulations (such as European Directive 2003/53/EC) require the concentration of soluble chromium (VI) in cements to be less than 2 ppm.

One common technique for manufacturing cement having a low soluble chromium (VI) content involves the addition of ferrous sulphate ($FeSO_4$) to the cement, as the $Fe^{2+}$ ions reduces the Cr(IV) ions. The ferrous sulphate is typically added at the mill inlet in the case of open-circuit mills or at the separator inlet in the case of closed-circuit mills, or else directly to the finished product.

However, a problem which is encountered with this technique is the instability of the ferrous sulphate under the storage conditions of the cement. Over time, the $Fe^{2+}$ ferrous ions undergo oxidation to $Fe^{3+}$ ferric ions, which are ineffective in reducing chromium (VI). Consequently, the amount of ferrous sulphate which is generally incorporated into the cement is much greater than the amount of ferrous sulphate required theoretically to reduce the soluble chromium (VI). At the present time the amount of ferrous sulphate heptahydrate which are used in cement vary sharply, between 300 and 1000 ppm of ferrous sulphate heptahydrate (corresponding to between 60 and 200 ppm of ferrous iron, $Fe^{2+}$) per ppm of soluble Cr (VI), depending upon the anticipated efficacy over time of the ferrous sulphate.

There is therefore a need to provide ferrous sulphate particles which oxidise or degrade more slowly than the ferrous sulphate presently available, in order to remedy to the instability of this compound and to reduce the amount of ferrous sulphate that has to be incorporated into a cement to reduce a given amount of soluble chromium (VI) present into the mix and/or to better control this amount.

SUMMARY OF THE INVENTION

It has now been found that a coating of at least one product of the hydrolysis of a collagen material is particularly effective to achieve such purposes.

Thus one aspect of the invention is a method for producing a cement-containing material, preferably one having a low content of soluble Cr (VI), which comprises the step of providing a cement-containing material with metallic sulphate particles coated with at least one product of the hydrolysis of a collagen material.

According to another aspect of the invention it is provided a method for reducing the content of soluble Cr (VI) in a cement-containing material, said method comprising the step of admixing to said cement-containing material a given amount of metallic sulphate particles coated with at least one product of the hydrolysis of a collagen material. The given amount is less than 80 ppm, preferably less than 60 ppm, more preferably less than 40 ppm, advantageously less than 20 ppm by weight of the metallic ion of said metallic sulphate per ppm of soluble Cr (VI) contained in the cement-containing material before the admixing step.

According to a further aspect of the invention there is provided a cement-containing composition which comprises:
 a cement; and
 metallic sulphate particles coated with at least one product of the hydrolysis of a collagen material.

The use of metallic sulphate particles coated with a collagen derived material as an additive in a cement—containing composition is also encompassed by the invention. In a cement-containing composition such as mortar or concrete, the additive can be present within the cement or can be admixed at a later stage, during the actual mixing of the cement with aggregates and/or water.

DETAILED DESCRIPTION

For purposes of simplification, the whole of the remainder of the description has been drafted in relation to ferrous sulphate being the metallic sulphate particles as this is the preferred metallic sulphate according to the invention. Nevertheless, it remains that, throughout the text below, the ferrous sulphate particles may be replaced in an equivalent manner by other metallic sulphate particles or their mixture thereof. Other preferred sulphate particles are manganese sulphate or tin sulphate particles, given that these two chemical compounds are also capable of reducing soluble chromium (VI), and exhibit a natural relative instability.

Preferably, the metallic sulphate according to the present invention is chosen from the group comprising ferrous sulphates, tin sulphates, manganese sulphates and mixtures thereof.

The ferrous sulphate used in the present invention is preferably hydrated and can advantageously be chosen from the group comprising wet heptahydrated ferrous sulphate, dry heptahydrated ferrous sulphate, quadrihydrated ferrous sulphate, monohydrated ferrous sulphate and the mixtures thereof. Particularly preferred is the heptahydrated form of ferrous sulphate, $FeSO_4.7H_2O$ which is commonly used in the cement field. Amongst the heptahydrated forms of ferrous sulphate, moist ferrous sulphate known as green vitriol or copperas can be advantageously used.

The "core" of the coated particles used in the invention is also the centre or the inner layer of said particles. The outer layer is also the coating and can adopt the attribute of a protective film, a shell or a casing.

Preferably the product of hydrolysis of a collagen material which is used as a coating in the invention is a gelatine or an "animal glue". Gelatine is a hydrocolloid, being a substance that forms a colloidal solution in water, which exhibits a unique combination of useful properties. These properties include water solubility, solution viscosity, thermally-reversed gelation properties and an ability to form strong and flexible films. Gelatine is available in various grades and, in turn, has different properties. Commercially, gelatines tend to be graded in terms of their gel strengths (bloom value) under standard test conditions. Usually, gelatine having a jelly (viscosity) strength from 100 to 520 g bloom can be selected, preferably from 200 to 380 g bloom.

The gelatine used as a preferred main component of the coating film in this invention is not particularly limited to any high degree of purity. On the contrary more "raw" types of gelatines like animal glues which are obtained using from the hydrolysis (i.e. boiling) of collagen-rich raw substances from bovine, swine, poultry or fish origin can advantageously be used. In the present application the term "gelatine" is used as encompassing not only reasonably pure hydrolysed collagen but also much rawer materials such as animal glue.

Alternatively vegetable protein-derived materials or "plant gelatine" as presented by the patent US20020187185, which have good physical properties and may be used as a suitable alternative to gelatine from animal origin.

Conventional gelatines used for general capsules such as acid-treated gelatines (type A), alkali-treated gelatines (type B), amphoterically-treated gelatines, chemically-modified gelatines obtained by reacting an amino group of the gelatine with an organic acid such as succinic acid, phtalic acid, or the like may be used. Among them, the acid-treated gelatine (type A) and the alkali-treated gelatine (type B) are preferably used. These various types of gelatines can of course be used alone or in a combination thereof.

It is recommended that the coating of said coated particles ranges from 0.05% to 20%, preferably from 0.5% to 4% in weight relative to the weight of the uncoated metallic sulphate particles.

Advantageously, the coated particles as defined above have a size $d_{max}$ (screen undersize) of less than 500 µm, in particular less than 200 µm and preferably less than 100 µm.

Optionally additional coatings might be applied, for example to reinforce the resistance of the gelatine-based coating. Such additional coating might be made of a cross-linking or a hardening agent to prevent dissolution of the coating.

The particles according to the present invention may be added at any time in the manufacture of a cement. The particles may be added at the mill inlet in the case of open-circuit mills, or at the separator inlet in the case of closed-circuit mills, or else directly to the finished product. The latter solution is preferred, in so far as it limits the actions of attrition on the surface of the particles. The particles may also be added in the bunkers or in the transport tanks, or else to the final concrete or mortar.

The particles according to the present invention have no notable effect on the conditions of use of the cement, which can therefore be used in an entirely conventional way.

The coated metallic sulphate particles according to the present invention can be obtained according to any known process. However it is preferred to use the process which is the subject matter of the Brazilian patent application n° PI 0701693-0 filed on May 10 2007 in the name of Instituto de Pesquisas Tecnológicas (IPT) & Fermavi Electroquímica. The process is outlined below with respect to gelatine-coated ferrous sulphate particles and will be further detailed in the examples.

The hydrated ferrous sulphate must first be partially or totally dehydrated. This can be carried out by any drying or precipitation process which allows its removal. Whatever the technique used, it is recommended to remove a quantity of water at least equivalent to 30% in mass of the crystallisation water of the substance to be encapsulated, preferably from 40 to 70%.

The gelatine is dissolved within a volume of water equivalent to the crystallisation water removed from the ferrous sulphate, under controlled temperature, preferably from 15 to 60° C., and more preferably from 40 to 50° C.

The dried ferrous sulphate particles are then mixed with the gelatine solution using conventional stirring and mixing equipment like mechanical mixers with intense stirring. The solution can be added in a one step (batch) or gradually (continuous process). At the end of the mixing step, the obtained material (generally under paste form) is maintained at rest, preferably in the form of layer of small thickness, for a period sufficient for re-hydration of the active substance with the water of the coating material solution. This operation results into an increase of the temperature of the material which is due to the hydration heat and the coating material solidifies at its surface.

After the re-hydration, the dried material is submitted to a mechanical disintegration of the aggregated particles of the coated and hydrated ferrous sulphate. The disintegration of this material is easily obtained with any process which favours the contact and mechanical stirring of these aggregates, like roll mills, fluidised bed, or even pneumatic transport.

According to one preferred embodiment, the amount of coated particles in the cement-containing material according to the present invention is less than 80 ppm, preferably less than 60 ppm, more preferably less than 40 ppm, and advantageously less than 20 ppm by weight of the metallic ion of said metallic sulphate per ppm of soluble Cr (VI) present in said cement-containing material prior to the addition of said coated particles. Said soluble chromium (VI) content is expressed relative to the dry weight of the cement mix, and is measured on cement liquor as described in the standard EN 196-10 "Method of testing cement—Part 10: Determination of the water—soluble chromium(VI) content of cement".

The gelatine is useful for stabilizing the ferrous sulphate. The coated ferrous sulphate is therefore substantially stable for a storage period, notably when mixed with cement, of at least 3 months, preferably 9 months and up to 12 months under the commonplace storage conditions of cement, particularly in bunkers or paper bags. By "substantially stable" it is meant that there remains in the cement a sufficient amount of $Fe^{2+}$ ions to reduce the amount of soluble chromium (VI) to less than 2 ppm. According to a particular aspect of the present invention, the reduction of the soluble Cr (VI), when water is added to cement, is possible according to the present invention from the mixing of the coated particles with cement. Preferably, the reducing effect of the coated particles according to the present invention is maintained for at least the above mentioned storage period of the cement.

Cement used according to the present invention is any type of cement, especially hydraulic cement such as, in particular, Portland cement, or composite cements, or any cement defined in standard EN 197 or any cement defined in standard ASTM C-150 and C-595.

The cement or cement-containing composition can be used in the production of various cement-based products such as concrete or mortar.

Preferably, the cement-containing material according to the present invention is a cement, a concrete or a mortar.

The present invention overcomes some of the drawbacks of the prior art and more particularly significantly reduces the amount of metallic sulphate which is needed to be added into a cement in order to reduce durably the soluble chromium (VI) present in that cement prior to the addition. The reduction of the amount of metallic sulphate used permits undisputable savings.

A second advantage is that the coated particles according to the present invention do not alter the amount of entrained air in cement-containing material, nor alter the mechanical strengths of such material, compared to cements not treated with ferrous sulphate.

The metallic sulphate particles coated with a collagen-derivative exhibit the following characteristics:
  the metallic sulphate is protected from the external environment by the coating, and therefore remains essentially stable under the storage conditions of the cement;
  the Cr-reducing substance (e.g. $Fe^{2+}$ ions) can be liberated rapidly (in particular in less than 10 minutes and preferably in less than 5 minutes) when the concrete or mortar is mixed, thereby making it possible to reduce the $Cr^{6+}$ ions;
In the case where the metallic sulphate chosen is ferrous sulphate:
  the effective preservation of the ferrous sulphate in the cement before use, and the high solubility of the ferrous sulphate during mixing of the cement, makes it possible to reduce the level of ferrous sulphate as compared with the prior art;
  the cost of the coated particles, which is linked to the raw materials and to the manufacture, is low and the dosage of the ferrous sulphate is low, thereby making the solution as proposed by the invention advantageous economically as compared with the prior art.

When using the method according to the invention, coated metallic sulphate particles retain their reducing effect for up to 3 months, preferably up to 12 months.

A further aspect of the present invention is a cement-containing composition which comprises a cement and metallic sulphate particles coated with at least one product of the hydrolysis of a collagen material.

In one embodiment, the metallic sulphate is chosen from the group comprising hydrated ferrous sulphates, tin sulphates, manganese sulphates and mixtures thereof. In another embodiment, the ferrous sulphate is chosen from the group comprising wet heptahydrated ferrous sulphate, dry heptahydrated ferrous sulphate, quadrihydrated ferrous sulphate, monohydrated ferrous sulphate and the mixtures thereof.

Preferably, the product of the hydrolysis of a collagen material according to the present invention is a gelatine or an animal glue.

In a preferred embodiment, the coated particles have a size $d_{max}$ of less than 500 μm, preferably less than 100 μm.

In another embodiment, the coating of said coated particles is ranging from 0.05% to 20%, preferably from 0.5% to 4% in weight relative to the weight of the uncoated metallic sulphate particles.

Preferably, the cement-containing composition is a cement, a concrete or a mortar. Advantageously, the amount of said coated particles in said composition is less than 80 ppm, preferably less than 60 ppm, more preferably less than 40 ppm, and advantageously less than 20 ppm by weight of the metallic ion of said metallic sulphate per ppm of soluble Cr (VI) present in said cement-containing composition prior to the addition of said coated particles.

Preferably the composition of the invention has a resulting soluble chromium (VI) content of less than 2 ppm.

EXAMPLES

The examples that follow illustrate the invention without limiting it.

Process for the Production of Heptahydrated $FeSO_4$ Particles Coated with 1% Gelatine.

Step 1—Partial Dehydration of Heptahydrated Ferrous Sulphate

The initial step, or material dehydration, was performed with a fluidised bed dryer/dehydrator fed with 1 ton of $FeSO_4.7H_2O$ particles per hour. With this type of equipment, the solid material to be dehydrated was placed in contact with a heated drying gas stream capable of providing the energy necessary for the evaporation of the water incorporated into the ferrous sulphate.

In the example presented here, the used gas was GLP (Liquefied Petroleum Gas) combustion gas which was diluted with atmospheric air in a controlled way, so as to control the oxygen quantity within the drier atmosphere and thus to avoid the oxidation of Fe (II) into Fe (III) in the product. The dryer was provided with GLP combustion gas with a volumetric flow of 7000 m$^3$ per hour at a temperature of 250-300° C.

The temperature of the gas at the output of the dryer was maintained at 90° C. to control the residence time of the ferrous sulphate into the drier (about 6 min., with a mass of 100 kg permanently inside the drier) and the quantity of the eliminated hydration water (about 60-70% of the crystallisation water of the heptahydrate form).

Step 2—Preparation of the Coating Material Solution

Gelatine type B was used as coating material (210-230 g bloom and viscosity 30-41 mps). Within a volume of water equivalent to 60% of the crystallisation water of $FeSO_4.7H_2O$, a quantity of gelatine type B equivalent to 1% in mass of the quantity of $FeSO_4.7H_2O$, was dissolved, at a temperature of 40° C. An aqueous solution containing 37 grams of gelatine per litre of water was thus obtained.

Step 3—Mixing of the Ferrous (II) Sulphate Partially Dehydrated with the Gelatine Solution.

The ferrous sulphate previously dehydrated (having lost 60% of its crystallisation water, or 27 kg of water for 100 kg of heptahydrate ferrous II sulphate initially) was added to the gelatine solution into a mixing reactor, until the obtention of a homogenous mixture, in a semi-solid (paste) form:
  9.1 kg of $FeSO_4 \times H_2O$ (partially hydrated, with 1<x<4) and
    3.6 kg of gelatine solution (37 g of gelatine/litre of water) were provided per minute for continuous mixing, corresponding to a mass ratio of gelatine solution to sulphate of 40%. The residence time of the product within the mixer was 2 minutes.

Step 4—Coating of the Ferrous Sulphate by the Gelatine

The obtained mixture was discharged and maintained at rest for 30 minutes, which is the period necessary for the absorption of the water of the gelatine solution by the ferrous (II) sulphate crystals, and for the deposition of the gelatine on the rehydrated particles. After this period, the material, already under solid form, was gently disintegrated in a roll mill, in order to obtain the product with the desired fineness (less than 200 microns).

Tables 1, 2 and 3 show some characteristics of the particles at different steps of the process. As it can be seen, the particle size of the ferrous (II) sulphate heptahydrated dehydrated (Table 2) was narrower than that of the "raw material" fed to the first step of the process (drying step)—Table 1. The encapsulation step led to a slight increase of particle size, as shown in Table 3, which was adequate to obtain the preferred particles granulometry (or fineness).

TABLE 1

Ferrous sulphate heptahydrate (raw material)

| | |
|---|---|
| Fe (II) | 20.2% |
| Fe total | 20.9% |
| Water loss at 105° C. | 36.3% |
| Particle size: | |
| D (0.5) | 383.1 μm |
| D (0.1) | 207.8 μm |
| D (0.9) | 591.8 μm |
| Fraction <200 microns | 9.1% |
| Fraction <100 microns | 1.8% |

TABLE 2

Ferrous sulphate after dehydrating step

| | |
|---|---|
| Fe (II) | 28.2% |
| Fe total | 28.9% |
| Water loss at 105° C. | 6.1% |
| Particle size: | |
| D (0.5) | 13.7 μm |
| D (0.1) | 1.3 μm |
| D (0.9) | 93.1 μm |
| Fraction <200 microns | 100.0% |
| Fraction <100 microns | 92.7% |

TABLE 3

Ferrous sulphate heptahydrated coated with gelatine (1% in mass related to the ferrous sulphate)

| | |
|---|---|
| Fe (II) | 22.0% |
| Fe total | 22.3% |
| Water loss at 105° C. | 21.9% |
| Particle size: | |
| D (0.5) | 71.4 μm |
| D (0.1) | 5.3 μm |
| D (0.9) | 145.5 μm |
| Fraction <200 microns | 99.6% |
| Fraction <100 microns | 70.4% |

Process for the Production of Heptahydrated $FeSO_4$ Articles Coated with 2% Gelatine.

The process as described above was repeated to obtain a product with 2% of the same type of gelatine used as coating material (industrial gelatine, 210-230 g bloom and viscosity of 30-41 mps).

A quantity of gelatine type B equivalent to 2% in mass of the quantity of $FeSO_4.7H_2O$, was dissolved in a volume of water equivalent to 60% of the crystallisation water of $FeSO_4.7H_2O$ at a temperature of 40° C. An aqueous solution containing 74 grams of gelatine per litre of water was obtained.

Steps (3) and (4) were similar to the ones used in the process described to obtain 1% gelatine coated particles.

TABLE 4

Ferrous sulphate heptahydrated coated with gelatine (2% in mass related to the ferrous sulphate)

| | |
|---|---|
| Fe (II) | 22.2% |
| Fe total | 22.9% |
| Water loss at 105° C. | 20.8% |
| Particle size: | |
| D (0.5) | 46.9 μm |
| D (0.1) | 4.5 μm |
| D (0.9) | 128.9 μm |
| Fraction <200 microns | 100.0% |
| Fraction <100 microns | 72.7% |

Comparative Examples of the Efficacy of the Reduction of the Soluble Chromium (VI) in Cement After having mixed either the raw ferrous sulphate or the coated ferrous sulphate particles according to the invention into the cement, the cement was subjected to an accelerated ageing protocol, which is described below. This accelerated ageing protocol constitutes severe (extreme) keeping conditions for the cement. Therefore, the observation of "good" characteristics of the cement (in terms of low chromium (VI) content) under accelerated ageing conditions signifies a fortiori that the said cement will necessarily also have good characteristics under commonplace storage/keeping conditions.

To combine the ferrous sulphate (gelatine-coated or uncoated) with the cement, the ferrous sulphate was mixed and homogenized with the cement for 45 minutes in a Turbula® mixer before the product was aged.

Ageing Protocol: High Humidity

This test involved placing a bed of cement powder containing ferrous sulphate in a tray: the mass of cement was approximately 600 grams and the depth of the cement layer was 1 cm. This tray was then placed in a chamber, which was maintained at 20° C. and at 100% relative humidity. The tray remained in the chamber for 24 hours, after which the amount of soluble chromium (VI) was measured. Measurement took place at day 1.

Soluble Chromium (VI) Measurement Procedure

The chromium (VI) was assayed in accordance with the standard EN 196-10 "Methods of testing cement—Part 10: Determination of the water-soluble chromium (VI) content of cement".

Example 1

Reduction of Soluble Chromium (VI) Amount in Cement Using 2% Gelatine-Coated Particles 2% gelatine-coated ferrous sulphate particles of the following granulometry were obtained using the process as described above.

The coated particles had the following granulometry:

| Particle size | % by mass of undersize |
|---|---|
| 500 μm | 98 |
| 200 μm | 90 |
| 100 μm | 73 |

Various cements were admixed with raw ferrous sulphate powder or with coated particles and the reduction of the chromium (VI) in various cements was measured. The particular cements used in the example are identified by reference to the well-known standards BS EN 197-1:2000 and BS 4027:1996. Thus "CEM I" refers to standard Portland cement and the code 52,5N refers to the strength class.

Experimental Results

The expression "control" used underneath refers to cement (with or without ferrous sulphate or coated particles) that has not undergone ageing. The "control" soluble chromium (VI) measurements were therefore obtained on an un-aged control cement or on an un-aged cement mixed with ferrous sulphate, immediately after mixing and homogenisation in the Turbula®.

TABLE 1

A CEM I 52,5N cement containing 15 ppm of soluble chromium (VI) was used.

| | Amount | Amount of soluble Cr (VI) | |
|---|---|---|---|
| Fraction tested | ppm Fe2+ per ppm Cr (VI) | Control ppm | After ageing test ppm |
| None | — | 15 | 9.5 |
| Uncoated ferrous sulphate | 50 | <1 | 8.5 |
| Uncoated ferrous sulphate | 110 | <1 | 5.3 |
| Coated ferrous sulphate | 45 | <1 | <1 |

The results of Table 1 clearly show, even under very unfavourable humidity conditions, that the use of the coated particles according to the invention allows a much more effective reduction in soluble chromium (VI) content than the use of uncoated ferrous sulphate.

TABLE 2

A CEM I 52,5N cement containing 9.5 ppm of soluble chromium (VI) was used.

| | Amount | Amount of soluble Cr (VI) | |
|---|---|---|---|
| Fraction tested | ppm Fe2+ per ppm Cr (VI) | Control ppm | After ageing test ppm |
| None | — | 9.5 | 5 |
| Uncoated ferrous sulphate | 45 | <2 | 3.2 |
| Coated ferrous sulphate | 45 | <2 | <2 |
| Coated ferrous sulphate | 35 | <2 | <2 |

TABLE 3

A CEM I 52,5N cement containing 12 ppm of soluble chromium (VI) was used.

| | Amount | Amount of soluble Cr (VI) | |
|---|---|---|---|
| Fraction tested | ppm Fe2+ per ppm Cr (VI) | Control ppm | After ageing test ppm |
| None | — | 12 | 6 |
| Coated ferrous sulphate | 45 | <1 | <1 |
| Coated ferrous sulphate | 35 | <1 | <1 |

Example 2

Reduction of Soluble Chromium (VI) Amount in Cement Using 1% Gelatine-Coated Particles The 1% gelatine-coated ferrous sulphate particles were obtained using the method described hereinabove.

In this example the amount of ferrous sulphate introduced into the cement in order to reduce the soluble chromium (VI) was varied.

Variable amounts of coated particles according to the invention were added to the cement, and the retention of efficacy on the part of the coated particles with regard to the reduction of soluble chromium (VI) was measured after accelerated ageing.

Experimental Results

TABLE 4

A CEM I 52,5N cement containing 13.3 ppm of soluble chromium (VI) was used which was treated with coated particles with 1% of gelatine.

| | Amount | Amount of soluble Cr (VI) | |
|---|---|---|---|
| Fraction tested | ppm Fe2+ per ppm Cr (VI) | Control ppm | After ageing test ppm |
| None | — | 13.3 | 6 |
| Uncoated ferrous sulphate | 40 | <0.5 | 6 |
| Ferrous sulphate coated with 1% of gelatine | 40 | <0.5 | <0.5 |
| Ferrous sulphate coated with 1% of gelatine | 35 | <0.5 | <0.5 |
| Ferrous sulphate coated with 1% of gelatine | 30 | <0.5 | <0.5 |
| Ferrous sulphate coated with 1% of gelatine | 20 | <0.5 | 1.2 |

It is observed that particles coated with 1% of gelatine, added at a rate of 40 ppm of Fe2+ per ppm of Cr (VI), remain effective with regard to the reduction of soluble chromium (VI) after the ageing test, whereas the uncoated ferrous sulphate powder, added at the same rate, leads to a measured value for soluble chromium (VI) after ageing of 6 ppm. This efficacy with regard to the reduction of soluble chromium (VI), in other words the measurement of soluble chromium (VI) values of less than 2 ppm after ageing, is retained even when the amount of coated ferrous particles introduced into the cement is divided by two.

Example 3

Impact of the Use of Different Kinds of Coating Around Ferrous Sulphate on the Quantity of Soluble Cr (VI) in a Normalised Mortar Cement 1 was a CEM 152.5N containing 12 ppm soluble Cr (VI).

Normalised mortar was made according to standard NF EN 196-1.

The measurement of entrained air was made according to standard NF EN 413-2. The coating protocol using material other than gelatine (oleate, oleic acid, acrylic styrene and alginate) comprises the following steps:
- dehydrating ferrous sulphate as described in step 1 above;
- preparing a coating solution by solubilising 1 or 2% of coating material by weight of dehydrated ferrous sulphate in an amount of water sufficient to rehydrate dehydrated ferrous sulphate and obtain heptahydrated ferrous sulphate;
- rapidly introducing about 200 g of the dehydrated ferrous sulphate on the coating solution at 90° C.;
- mixing in a Rayneri mixer, equipped with deflocculating fingers, at a speed between 500 and 1000 rpm;
- cooling and grinding in order to obtain coated particles with a mean diameter less than 100 μm.

TABLE 5

Negative impact of the use of a fatty acid on the quantity of entrained air measured on a normalised mortar

| Cement 1 | % entrained air |
| --- | --- |
| Non treated | 6 |
| Treated with ferrous sulphate coated with 2% gelatine (40 ppm Fe II per ppm Cr (VI)) | 6 |
| Treated with ferrous sulphate coated with 1.5% sodium oleate (40 ppm Fe II per ppm Cr (VI)) | 10.5 |
| Treated with ferrous sulphate coated with 0.7% sodium oleate (40 ppm Fe II per ppm Cr (VI)) | 9 |
| Treated with ferrous sulphate coated with 1.5% oleic acid (40 ppm Fe II per ppm Cr (VI)) | 10.5 |

As shown in table 5, cement treated with ferrous sulphate coated with gelatine presents the same percentage of entrained air as non treated cement.

On the contrary, cements treated with ferrous sulphate coated with sodium oleate or oleic acid present more entrained air than non treated cement.

The quantity of entrained air has a negative impact on mechanical strengths, as shown in table 6 hereinafter.

TABLE 6

Negative impact of the use of a fatty acid on the mechanical strengths measured on a normalised mortar

| Mechanical strengths measured on cement 1 treated with 40 ppm Fe II per ppm Cr (VI) | Uncoated ferrous sulphate | Ferrous sulphate coated with gelatine | Ferrous sulphate coated with 2% sodium oleate |
| --- | --- | --- | --- |
| Compressive strengths at 1 day (MPa) | 21.2 | 20.9 | 16.9 |
| Compressive strengths at 28 days (MPa) | 55.3 | 55.6 | 45.4 |

As shown in table 6, the compressive strengths of a mortar containing ferrous sulphate coated with gelatine are the same as those of a mortar containing uncoated ferrous sulphate.

On the contrary, the compressive strengths of a mortar containing ferrous sulphate coated with 2% sodium oleate are significantly lower than those of a mortar containing uncoated ferrous sulphate.

TABLE 7

Comparison between the quantity of uncoated ferrous sulphate and coated ferrous sulphate according to the invention added to cement 1

| | Amount | | Amount of soluble (Cr) VI | |
| --- | --- | --- | --- | --- |
| Tested fraction | % ferrous sulphate added to cement 1 | ppm Fe2+ per ppm Cr (VI) | Control ppm | After ageing test (protocol 2*) ppm |
| None | — | — | 19.5 | |
| Uncoated monohydrated ferrous sulphate containing 30.8% of Fe II | 0.37 | 58 | <0.01 | 0.2 |
| Ferrous sulphate coated with 2% of gelatine and containing 19.4% of Fe II | 0.37 | 37 | <0.01 | 0.2 |
| Uncoated monohydrated ferrous sulphate containing 30.8% of Fe II | 0.13 | 20 | | 2.3 |
| Ferrous sulphate coated with 2% of gelatine and containing 19.4% of Fe II | 0.2 | 20 | | 0.15 |
| Uncoated monohydrated ferrous sulphate containing 30.8% of Fe II | .0.065 | 10 | | 7.2 |
| Ferrous sulphate coated with 2% of gelatine and containing 19.4% of Fe II | 0.1 | 10 | | 0.2 |

*Protocol 2 differs from the protocol described above by the following points: the treated cement is still displayed in homogeneous slim coat, but instead of putting the receptacle in a climatic surrounding wall, it is put above a bed of water, inside a hermetic box, and the whole is stocked in a room regulated at 20° C.

As shown in table 7, the amount of Fe II added in cement is smaller when using a coated ferrous sulphate according to the invention (37 ppm Fe2+ per ppm Cr (VI)) than when using uncoated monohydrated ferrous sulphate (58 ppm Fe2+ per ppm Cr (VI)) for the same efficacy of the reduction of Cr (VI) (<0.01 ppm soluble Cr (VI) at initial time and 0.2 ppm soluble Cr (VI) after ageing test). A reduction of 36% of the amount of Fe II is shown.

It is even possible to reduce the quantity of Fe II by more than 50% for a given final amount of soluble Cr (VI). Indeed, the amount of soluble Cr (VI) is smaller with 10 ppm of coated ferrous sulphate according to the invention (0.2 ppm) than with 20 ppm of uncoated monohydrated ferrous sulphate (2.3 ppm).

Moreover, for a given amount of Fe2+ added in the cement (10 and 20 ppm per ppm Cr (VI)), the coated ferrous sulphate according to the invention keeps its reducing properties at a good level (0.15 and 0.2 ppm soluble Cr (VI)), whereas uncoated monohydrated ferrous sulphate does not (2.3 and 7.2 ppm soluble Cr (VI)).

TABLE 8

Comparison between the quantity of Cr (VI) in a non treated cement and in cements treated with ferrous sulphate coated with alginate or gelatine

| Cement 1 | Quantity of ferrous sulphate (ppm Fe II per ppm Cr (VI)) | Quantity of Cr (VI) at initial time (control) (ppm) | Quantity of Cr (VI) after ageing test (ppm) |
| --- | --- | --- | --- |
| Non treated | — | 12 | 7.3 |
| Treated with ferrous sulphate coated with alginate | 45 | 0.06 | 6.7 |
| Treated with ferrous sulphate coated with gelatine | 45 | 0.05 | 0.5 |

As shown in table 8, the quantity of Cr (VI) in a cement treated with ferrous sulphate coated with alginate is very low at initial time, but increases at a very high level (6.7 ppm) after the ageing test, nearly at the same level as a non treated cement. On the contrary, the quantity of Cr (VI) in a cement treated with ferrous sulphate coated with gelatine stays very low (0.5 ppm), even after the ageing test.

TABLE 9

Comparison between the quantity of Cr (VI) in a non treated cement and in cements treated with ferrous sulphate coated with an acrylic styrene (Acronal S 790, BASF) or gelatine

| Cement 1 | Quantity of ferrous sulphate (ppm Fe II per ppm Cr (VI)) | Quantity of Cr (VI) after ageing test according to protocol 2* (ppm) |
| --- | --- | --- |
| Non treated | — | 4.8 |
| Treated with ferrous sulphate coated with Acronal S 790 (BASF) | 40 | 2.5 |
| Treated with ferrous sulphate coated with gelatine | 40 | 0.1 |

As shown in table 9, the quantity of Cr (VI) in a cement treated with ferrous sulphate coated with an acrylic styrene (Acronal S 790) increases at a high level (2.5 ppm) after the ageing test, whereas the quantity of Cr (VI) in a cement treated with ferrous sulphate coated with gelatine stays very low (0.1 ppm), even after the ageing test.

The invention claimed is:

1. A process of reducing the amount of Cr (VI) in a cement-containing material comprising mixing the cement-containing material and metallic sulphate particles coated with at least one product of the hydrolysis of a collagen material.

2. The process according to claim 1, wherein said metallic sulphate is selected from the group consisting of ferrous sulphates, tin sulphates, manganese sulphates and mixtures thereof.

3. The process according to claim 2, wherein said ferrous sulphate is selected from the group consisting of wet heptahydrated ferrous sulphate, dry heptahydrated ferrous sulphate, quadrihydrated ferrous sulphate, monohydrated ferrous sulphate and the mixtures thereof.

4. The process according to claim 1, wherein said product is a gelatine or an animal glue.

5. The process according to claim 1, wherein the coated particles have a size $d_{max}$, of less than 500 μm.

6. The process according to claim 1, wherein the coating of said coated particles is ranging from 0.05% to 20% in weight relative to the weight of the uncoated metallic sulphate particles.

7. The process according to claim 1, wherein the amount of said coated particles in said cement-containing material is less than 80 ppm by weight of the metallic ion of said metallic sulphate per ppm of soluble Cr (VI) present in said cement-containing material prior to the addition of said coated particles.

8. A cement-containing composition which comprises a cement and metallic sulphate particles coated with at least one product of the hydrolysis of a collagen material.

9. The composition according to claim 8, wherein said metallic sulphate is selected from the group consisting of hydrated ferrous sulphates, tin sulphates, manganese sulphates and mixtures thereof.

10. The composition according to claim 9, wherein said ferrous sulphate is selected from the group consisting of wet heptahydrated ferrous sulphate, dry heptahydrated ferrous sulphate, quadrihydrated ferrous sulphate, monohydrated ferrous sulphate and the mixtures thereof.

11. The composition according to claim 8, wherein said product is a gelatine or an animal glue.

12. The composition according to claim 8, wherein said coated particles have a size $d_{max}$, of less than 500 μm.

13. The composition according to claim 8, wherein the coating of said coated particles is ranging from 0.05% to 20% in weight relative to the weight of the uncoated metallic sulphate particles.

14. The composition according to claim 8, wherein the amount of said coated particles is less than 80 ppm by weight of the metallic ion of said metallic sulphate per ppm of soluble Cr (VI) present in said cement-containing composition prior to the addition of said coated particles.

15. A method for producing a cement-containing composition, the method comprising adding metallic sulphate particles coated with a collagen derived material to a cement-containing material.

16. The method according to claim 5, wherein the size $d_{max}$ is less than 100 μm.

17. The method according to claim 6, wherein the coating of said coated particles is ranging from 0.5% to 4% in weight relative to the weight of the uncoated metallic sulphate particles.

18. The composition according to claim 12, wherein the size $d_{max}$ is less than 100 μm.

19. The composition according to claim 13, wherein the coating of said coated particles is ranging from 0.5% to 4% in weight relative to the weight of the uncoated metallic sulphate particles.

20. The process of claim 1, wherein the cement-containing material is a cement, a concrete or a mortar.

* * * * *